United States Patent [19]
Oaks

[11] 3,921,276
[45] Nov. 25, 1975

[54] DEBRIS EJECTING MEANS FOR PIERCE NUT APPLYING TOOL

[75] Inventor: Daniel V. Oaks, Sterling Heights, Mich.

[73] Assignee: MacLean-Fogg Lock Nut Co., Mundelein, Ill.

[22] Filed: Sept. 16, 1974

[21] Appl. No.: 506,325

[52] U.S. Cl. ............... 29/208 D; 29/200 B; 29/432
[51] Int. Cl.² ......................................... B23P 19/04
[58] Field of Search ...... 29/200 B, 208 D, 509, 414, 29/417, 432.1, 432.2, 432, 208 E

[56] References Cited
UNITED STATES PATENTS

| | | | |
|---|---|---|---|
| 2,652,942 | 9/1953 | Muchy | 29/505 |
| 3,405,436 | 10/1968 | Koett | 29/211 D X |
| 3,693,237 | 9/1972 | Grube | 29/432.2 |
| 3,704,507 | 12/1972 | Grube | 29/417 |
| 3,775,833 | 12/1973 | Grube | 29/509 X |
| 3,810,290 | 5/1974 | Grube | 29/208 D |
| 3,811,171 | 5/1974 | Grube | 29/208 D |

Primary Examiner—Victor A. Di Palma
Attorney, Agent, or Firm—McCaleb, Lucas & Brugman

[57] ABSTRACT

A tool for applying flanged pierce nuts to a workpiece panel by forcing the pilot portion of the nut through a workpiece supported on an underlying apertured die, the pilot portion cutting a slug from the workpiece which is then discharged through the die aperture. The tool is particularly featured by a housing in which the punch reciprocates in line with a first opening through which successive pierce nuts are moved by the punch to the workpiece. Additional side openings communicate with lateral portions of the first opening normally occupied by the nut flanges. Cam means are provided in the housing adjacent the intersections of the nut passage and side openings for ejecting nut debris, comprising material and flanges deformed and severed from preceding nuts, through the side openings in response to movements of the tool toward the die. This prevents the buildup of such debris within the nut passage opening and protects the housing against bursting forces.

9 Claims, 11 Drawing Figures

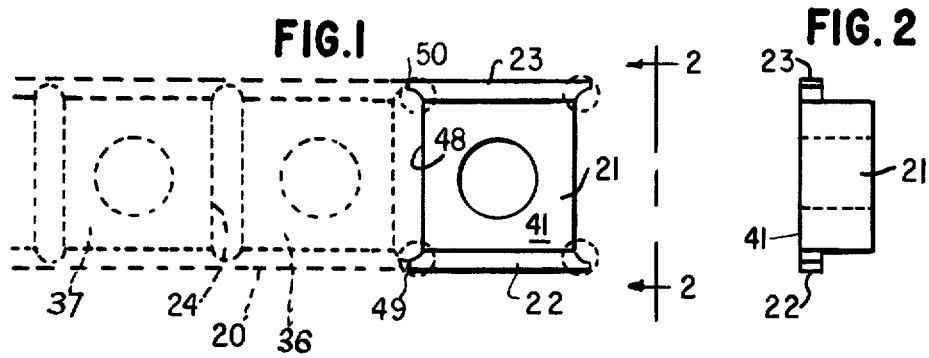
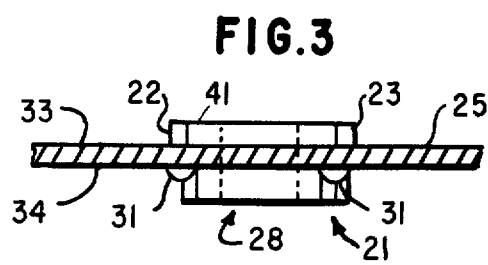
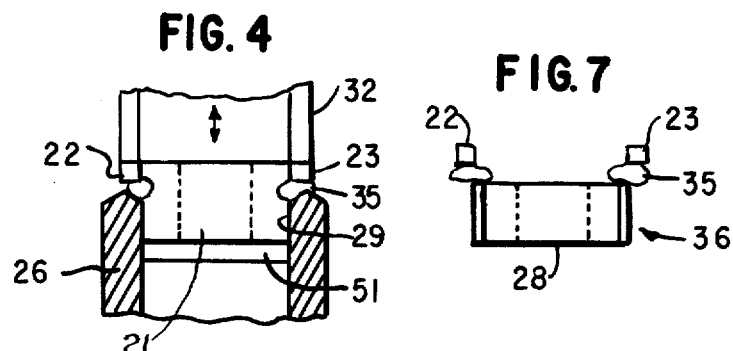
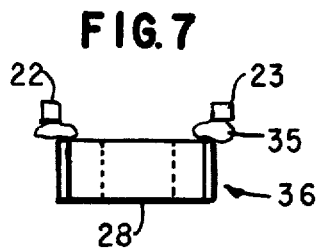
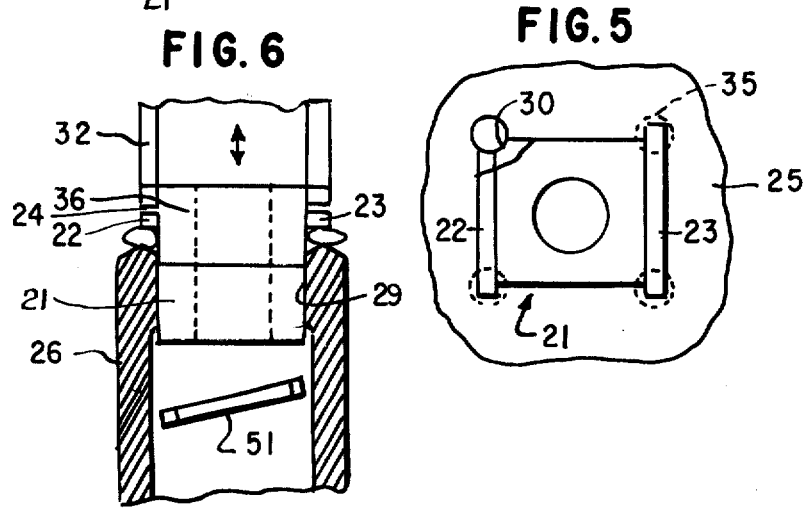
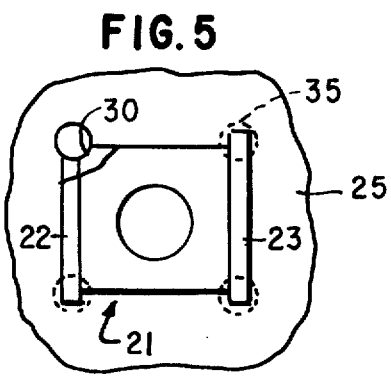

DEBRIS EJECTING MEANS FOR PIERCE NUT APPLYING TOOL

This invention relates to an improved tool for applying flanged pierce nuts to a panel.

In the affixing of stamped or sheet metal workpieces to frame or other machine elements, the technique presently used for large volume production is to prepare a nut with opposed laterally extending flanges on one axial end thereof, the other axial end being free to form a pilot portion on the nut. The nuts so formed are fed in aligned, spaced and similarly oriented fashion to an application tool which has a punch therein for striking the flanged end and thereafter pushing the pilot end through the workpiece until the nut flanges abut upon the workpiece. The pilot end of the nut excises a slug from the workpiece to form its own hole therein, and then, with the aid of an apertured die under the workpiece, the corners of the nut are deformed over the workpiece to clinch the nut to the workpiece. The pilot end of the nut is received in the aperture of the die while the said pilot end is being pushed through the workpiece. The slug precedes the pilot portion into the die aperture, and is ejected through the bottom of the die aperture by slugs formed by succeeding nuts. Such nuts are known in the art as pierce nuts.

It sometimes occurs that a workpiece is not placed under the application tool as expected so that the punch of the tool merely pushes a nut into the die until the flanges of the nut abut against the die. Should the absence of a workpiece go unnoticed for the next operation of the application tool, the pilot of the nut immediately following will push the preceding nut farther into the die aperture, breaking off its flanges which are unable to follow the pilot portion into the aperture. The material of the corners previously deformed is also broken off and may be pressure-welded to the flanges. To the material so broken off is added the deformed corner material of the said immediately following nut. The application of a third and fourth nut to the accummulated nuts, broken flanges and deformed corner material, still without a workpiece under the application tool, results in a build-up of pressure in the tool by the debris formed by the broken flanges and deformed corner material sufficient to burst the tool.

It is the object of this invention to provide an application tool for flanged pierce nuts wherein the tool is self-cleaning of debris resulting from broken nut flanges and deformed corner material from the nut, thereby avoiding the creation of stresses in the tool sufficient to cause it to burst.

A more specific object of this invention is to provide an application tool for flanged pierce nuts wherein the tool is formed with side openings adjacent the flanges of the nut to be applied, with means activated by downward movement of the tool against a die for ejecting broken or loose flanges and deformed nut corner material laterally through the side openings, thereby to prevent the accumulation of such loose flange and corner debris in the tool in sufficient quantity to cause the tool to burst.

These and other objects of this invention will become apparent from the following detailed description of a preferred embodiment of the invention when taken together with the accompanying drawings in which:

FIG. 1 is a plan view of a flanged pierce nut to be applied to a workpiece;

FIG. 2 is an end elevation of the nut of FIG. 1;

FIG. 3 is a front elevation of the nut as it appears when applied and clinched to a workpiece.

FIG. 4 shows an end elevation of the nut as it is applied to a die in the absence of a workpiece, the section being taken transversely of the nut;

FIG. 5 is a plan view of the nut of FIG. 4;

FIG. 6 shows the conditions in the die when two nuts are applied successively to the die in the absence of a workpiece;

FIG. 7 is an end elevation of the nut alone in the conditions of FIG. 6 wherein the flanges and deformed corner material have been broken off and separated from the nut;

Figure 8:
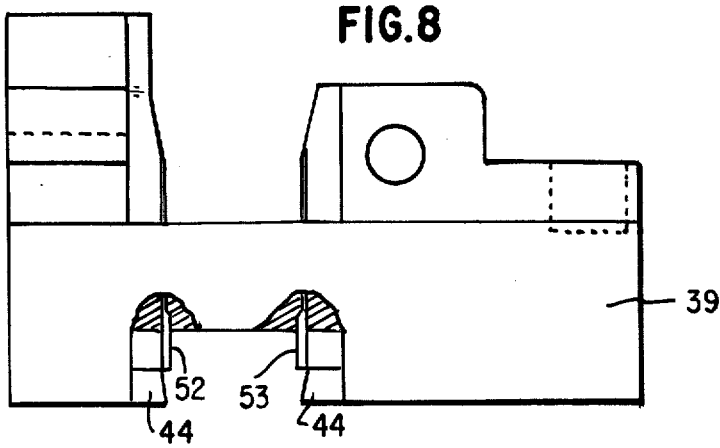
FIGS. 8, 9 and 10 are respectively front elevation, plan view and end elevation in section taken along line 10—10 of FIG. 9, of the lower portion of an application tool for the nuts of FIGS. 1-7 to which this invention has been applied.

In the best mode selected for illustrative purposes herein, this invention is comprised of a modification of prior tools used to apply pierce nuts to a workpiece, in which modification side openings are formed in the tool by any suitable means, one opening adjacent each flange of a flanged pierce nut. Each side opening is of a length greater than the length of a flange and of a height approximately equal to twice the height of a flange, such that a flange can readily pass through an opening in a sidewise manner. Within the tool, and outside the normal planar profile of a flanged nut, are a pair of upwardly and outwardly inclined surfaces which are contacted by debris comprised essentially of inwardly deformed flange or nut-clinching material to give such flange or material a lateral thrust as the tool moves down upon its die. The lateral thrust is sufficient to eject the debris out of the tool through the adjacent opening.

The inclined surfaces do not interfere with the normal movement of flanged pierce nuts through the tool, but debris which is spread laterally by the downward blow thereon from the punch in the tool is deformed into the path of the inclined surfaces and hence is readily contacted and ejected laterally thereby. Tests have demonstrated that without the inclined surfaces, insufficient lateral force is developed in the debris by the tool, and hence, even though side openings are provided in the tool adjacent the debris, the debris continues to accumulate and eventually bursts the tool.

Referring now to the drawings for a detailed description of the embodiment illustrated, FIGS. 1 and 2 show a form of flanged pierce nut which is extensively used in the automobile industry. It is formed as a part of a continuous strip 20 (shown in dotted outline in FIG. 1) in accordance with the teachings of U.S. Pat. No. 3,704,507 to William L. Grube dated Dec. 5, 1972. The strip is fed automatically into and through a pierce nut applying tool of the kind illustrated and claimed in U.S. Pat. No. 3,811,171 to William L. Grube dated May 21, 1974. Thus the strip is comprised of a series of nuts 21 each having a pair of opposed flanges 22 and 23 running the length of the strip. Openings 24 are made in the strip to form the individual nuts, the openings extending into the opposed flanges to provide small flexible connectors between adjacent nuts.

The nut applying tool is constructed to feed the strip 20 laterally therethrough, one nut at a time, the end nut being placed under a punch 32 (FIGS. 4, 6 and 11) in the tool which cuts the connecting sections of flanges in half and pushes the nut downward upon and partly through a workpiece 25 as shown in FIG. 3. In the applying process an apertured die 26 (FIGS. 4, 6 and 11) under the workpiece 25 cooperates with the nut (the latter acting as a punch) to excise a slug 51 out of the workpiece 25 thus forming a hole in the workpiece through which extends the portion of the nut 28 opposite the flanged face of the nut. The hole-forming part of the nut is referred to herein as the pilot portion of the nut.

Figure 11:
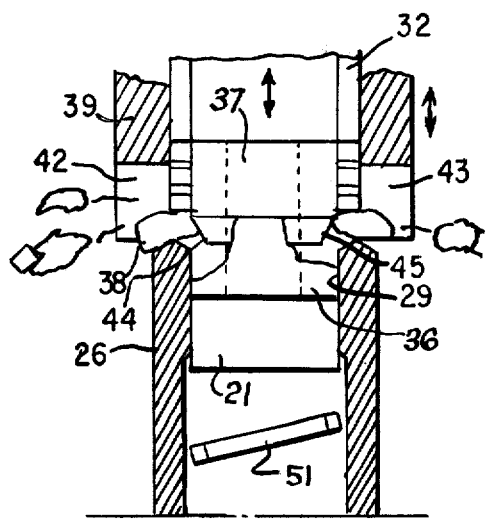
FIG. 11 is an end elevation similar to FIG. 6, showing a third nut applied to the die, with the novel debris-ejecting means shown in operation.

Die 26 is shown in cross-section in FIGS. 4, 6 and 11, the section being taken transversely of the nut, i.e., across the flanges 22,23. Die 26 has a central opening 29 of the size and shape of pilot portion 28 of nut 21, except at the corners, to act with nut 21 as a shear to excise said slug 51 from workpiece 25. The corners of opening 29 are formed with inwardly extending protrusions 30 (FIG. 5) which cut the corners of the nut and deform the cut material radially outwardly under the workpiece to form spherically shaped clinching lugs 31. The details of die 26 and of the steps in the excising and clinching operations are all set forth in U.S. Pat. No. 3,775,833 to W. L. Grube, dated Dec. 4, 1973. Thus in the normal operation of the application tool, a nut 21 will be placed under a punch 32 in the tool with its pilot portion 28 extending downward toward a workpiece 25 which has been placed over a die 26. Nut 21 will then be brought down on workpiece 25 until pilot portion 28 of nut 21 excises a slug 51 from workpiece 25, flanges 22 and 23 bear against the workpiece upper surface 33, and lugs 31 have been cut from the corners of the pilot portion and deformed and compacted against the bottom surface 34 of workpiece 25 to clinch nut 21 thereto.

It sometimes occurs, particularly when the pierce nut applying operation is one of several performed in sequence upon a workpiece being shaped in a progressive die, that the advancing mechanism for the workpiece fails to work, although the nut applying tool continues to work. In such situations there is no workpiece under the punch 32 and hence the pierce nuts are applied successively directly upon die 26.

The situation which obtains when a first nut 21 is applied to a die without an intermediate workpiece is shown in FIG. 4. It may be noted that the material 35 cut from the corners of the nut has been increased in volume by the corner material normally in the opening in the workpiece 25 and out of contact with die 26. Such material 35 accumulates under, and is compacted against, flanges 22, 23. Material 35 may take an indefinite shape, but will in any event flow outwardly of the nut into the area defined by openings 24 between adjacent nuts. As described in the aforementioned Grube U.S. Pat. No. 3,811,171 for the nut applying tool, the punch 32 has a bottom surface which is of the shape of the upper surface of a nut 21, including portions which overlie flanges 22, 23 and the severed connectors.

The situation which obtains when a second nut is applied over a first nut, both without the presence of a workpiece 25, is shown in FIG. 6. Here the second nut 36 has been prevented from fully entering the opening 29 in die 26 by the preceding nut 21, but the pilot portion of the second nut has acted as a punch and has pushed the first nut 21 farther into opening 29. Since flanges 22, 23 of the first nut are restrained by the upper surface of the die, they are broken off from the first nut and remain under the corresponding flanges of the second nut 36. Insofar as first nut 21 has been further advanced through opening 29, additional corner material has been cut from the upper portion of the nut, and to this corner material has been added that of the lower part of the pilot portion of the second nut. The total volume of deformed corner material has been increased and has moved laterally under the pressure of the punch. The pressure upon the sides of the tool adjacent the flanges exerted by this corner material begins to approach the bursting point of the tool, if it has not already exceeded it.

Assuming that the tool has not yet burst and that a third nut 37 (FIG. 1) is applied over second nut 36, the situation shown in FIG. 11 will obtain. It is apparent that the flanges of the second nut will be broken from the body of the second nut by the third nut as the second nut body is driven into die 26 thereby. It is equally apparent that a further accumulation 38 of corner material will take place, the material of FIG. 6 being augmented by the continued cutting of the corners of the second nut. The lateral pressure upon the sides of the tool adjacent the accumulated corner material may now be sufficient to burst the tool.

It is to the relief of this lateral pressure that the present invention is addressed and the means by which such relief is effected will now be described.

Figure 9:
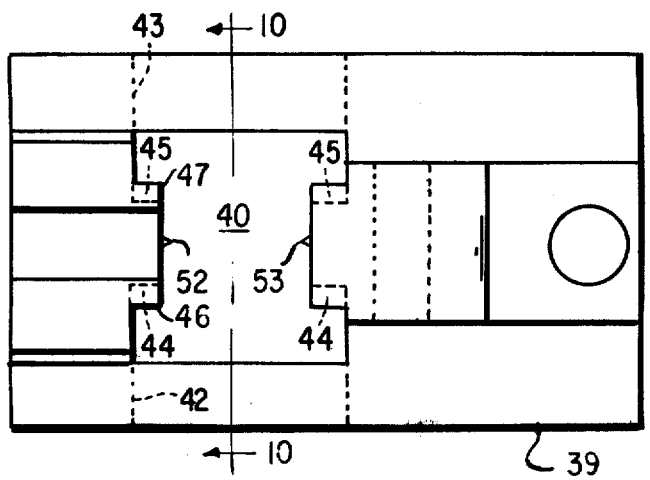
Figure 10:
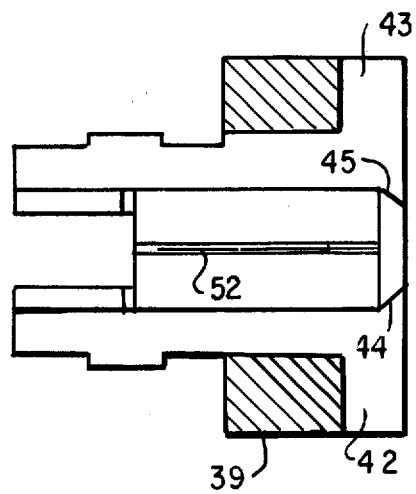

Referring now to FIGS. 8, 9 and 10, the pertinent portion of the pierce nut application tool, viz., the lower portion, is there shown in detail. It comprises a frame or housing 39 which may be a cast part, or one made up of machined parts appropriately united by threaded fasteners or welding. In said frame is a vertically directed opening 40 (FIG. 9) which has a contour closely approximating the contour or outline of the upper surface 41 of a nut 21 as seen in FIG. 1. This opening must be kept clear and free of protrusions so that under ordinary conditions the passage of a nut therethrough is unhindered. Since the surface of the punch contacting the upper surface of the nut has a substantially identical contour, reciprocation of the lower portion of the punch in the tool must likewise be unhindered by any protrusions in this opening. Thus any means used to clear the tool of accumulated broken flanges and severed corner material must operate outside the confines of opening 40. It likewise must operate in a manner not to oppose the movement of punch 32, but rather should be powered or energized by said punch.

In accordance with the present invention, elimination of accumulated debris in the application tool is effected first by providing side openings 42 and 43 in the bottom of the tool alongside the flanges 22 and 23 of the nuts 21 in the tool. As the flanges and deformed corner material accumulate above die 26 in the tool, said openings 42 and 43 provide passages for the lateral movement of this debris out of the tool. As stated above, however, it has been found by actual tests that these openings alone are not sufficient for this purpose since the forces on the debris produced by punch 32 are predominately vertical and insufficient directed force is available to initiate the lateral movement of the debris out of the tool.

Secondly, therefore, upwardly and outwardly tapered camming surfaces 44 and 45 are formed in the bottom of opening 40 adjacent those portions of opening 40 which define the interior corners 46, 47 (FIG. 9) formed by the transverse side 48 (FIG. 1) of a nut and the fragments 49, 50 of the connectors between adjacent nuts. It will be recalled that the deformed corner material such as 38 (FIG. 11) cut from a nut flows into the space adjacent these nut corners and hence flows under camming surfaces 44 and 45. Therefore, when the tool is brought down on an accumulation of corner material 38, the required lateral force is developed by camming surfaces 44 and 45 against the corner material to eject the material through openings 42 and 43. The severed or broken flanges above the material will also move laterally through frictional contact with the material. All of the material and flanges will not necessarily move out at once, but the height of the openings 42 and 43 is sufficient to allow at least the lowermost broken flanges to leave with the corner material. This is sufficient to relieve the side pressure upon the tool and to prevent it from bursting.

It should be noted that under normal operating conditions the bottom of the tool will rest upon the upper surface of the workpiece and that since the flanged portion of the nut extends above that surface of the workpiece, the punch is designed not to come down to the surface of the workpiece, but only to the surface of an applied nut. It should also be noted that the deformed material, as shown in FIG. 3, is below the bottom surface of the workpiece and hence, if stuck in the tool, would extend below the bottom surface of the tool. Thus as the tool and debris descend upon a die without a workpiece for the second or third time, the accumulated downwardly protruding debris strikes the die first, and as the descent of the tool continues, the debris is moved up into the tool by the die against the camming surfaces 44, 45 and then laterally out of the tool.

The precise movement of the debris during the accumulation thereof and its subsequent ejection through the openings 42, 43 is not known, but tools constructed in accordance with FIGS. 8, 9 and 10 have been tested under production conditions and have been observed ejecting debris laterally out of openings 42, 43 at sufficient velocity to inhibit an accumulation of the debris just outside the tool and around die 26 where it would again be detrimental to the nut applying operation.

The absence of lateral guides in the tool for the flanges brought about by removing the sides of the tool to create openings 42 and 43 is compensated for by the presence of vertical sharp V-shaped beads 52, 53 which are spaced from one another a distance less than the longitudinal width of the nut so that the beads cut into the adjacent sides of the nut as the nut is pushed down by punch 32 and serve as guides to prevent transverse movement of the nuts. It may be noted from FIG. 8 that the apex of the beads has been removed above the openings where the sides of the tool can be relied upon to guide the nut, and hence the penetration of the beads into the nut is minimal thereat, amounting to little more than frictional contact. Where the sides of the tool have been relieved by openings 42 and 43, the beads penetrate the nut and form grooves therein to guide the nut past said side openings despite any lateral force which may be exerted upon the nut by the debris-ejecting means.

In some pierce nut applying tools an adapter is provided to be fastened to the bottom of the tool, the adapter serving to accumulate a stack of nuts through which the force of the punch is transmitted to a bottom nut of the stack. The purpose of the adapter is to enable the tool to apply nuts to a recessed workpiece. The present invention is applicable to such adapters as well as to tools used to punch each nut into a workpiece immediately upon its appearance under the punch.

The foregoing invention is applicable to any situation in a pierce nut applying process involving the creation of debris which may be deformed into the path of camming surfaces 44, 45, whether as a result of the absence of a workpiece as just described, or as a result of a failure to remove a workpiece after it has been operated upon by the nut applying tool. Although successive blows by a punch upon two or more stacked pieces of debris may cause them to adhere to one another firmly as in a pressure weld, the camming surfaces 44, 45 develop sufficient lateral force to break them loose and eject them from the tool. It is necessary, of course, that the camming surfaces are located inwardly of the debris relative to the flanged sides of the nut so that no part of the debris comes inward beyond the camming surfaces so as to be subjected to only a vertical compressive force.

I claim:

1. An application tool for punching the pilot portion of a flanged pierce nut through a workpiece by forcing the nut and workpiece against a supporting die, comprising: a housing, a punch reciprocable in the housing for engaging a nut therein and forcing its pilot portion through an underdisposed workpiece, the housing having a first opening aligned with the punch for guiding and affording passage of successive flanged nuts to a workpiece, said opening being susceptible to the accumulation of nut debris generated by preceding operations of the tool, said housing also having a side opening therethrough openly communicating laterally with said first opening, and means on said housing for positively ejecting said debris through said side opening to prevent the accumulation thereof in said first opening.

2. The tool of claim 1, wherein said means on said housing comprises an inclined camming surface disposed to engage said debris and positively direct the same laterally out of the housing through said side opening in response to forces imposed on the debris by operative movements of the tool toward the die.

3. The tool of claim 1, wherein said side opening communicates with a flange guiding portion of said first opening.

4. The tool of claim 1, wherein said punch has a cross-sectional contour substantially the same as the contour of the nut to be contacted thereby, the said first opening having a cross-sectional shape substantially the same as the cross-sectional contour of the punch and through which opening said punch reciprocates, and said means on the housing being located outside the shape defining said first opening.

5. The tool of claim 4, wherein said means on said housing comprises a camming surface located within the housing adapted to be engaged by the debris and angularly disposed relative to the direction of movement of the punch for operatively ejecting the debris laterally through said side opening.

6. The tool of claim 1, and portions of said debris being compacted against the die in the direction of movement of the punch by the force of the punch and thereby spread laterally of said direction, and said means on the housing acting upon said laterally spread debris to eject the same out of the housing through said side opening in response to operative movement of the tool toward said die.

7. The tool of claim 6, said debris being comprised of flanges broken from pierce nuts operated upon by the tool and portions of the nuts cut from the sides thereof said portions cut from the sides being adhered to the flanges, and said means on the housing contacting the portions cut from the sides and ejecting said portions and said adhered flanges from the tool.

8. The tool of claim 6 and means extending into the first opening from at least one side thereof to engage and guide a nut past said side opening.

9. The tool of claim 6, and a bead extending from a side of the first opening in the tool to cut into and guide a nut past said side opening.

* * * * *